US012595988B2

(12) United States Patent
Johnson et al.

(10) Patent No.: US 12,595,988 B2
(45) Date of Patent: Apr. 7, 2026

(54) STITCHED BODY ARMOR PANELS WITH OFFSET CONSTRUCTION

(71) Applicant: Point Blank Enterprises, Inc., Pompano Beach, FL (US)

(72) Inventors: Martha Johnson, Pompano Beach, FL (US); Randall Jered LeMarbe, Pompano Beach, FL (US)

(73) Assignee: Point Blank Enterprises, Inc., Pompano Beach, FL (US)

( * ) Notice: Subject to any disclaimer, the term of this patent is extended or adjusted under 35 U.S.C. 154(b) by 189 days.

(21) Appl. No.: 18/322,663

(22) Filed: May 24, 2023

(65) Prior Publication Data

US 2023/0384060 A1 Nov. 30, 2023

Related U.S. Application Data

(60) Provisional application No. 63/345,271, filed on May 24, 2022.

(51) Int. Cl.
| | |
|---|---|
| *F41H 1/02* | (2006.01) |
| *B32B 7/09* | (2019.01) |
| *B32B 27/08* | (2006.01) |
| *B32B 27/32* | (2006.01) |
| *B32B 27/34* | (2006.01) |
| *F41H 5/04* | (2006.01) |

(52) U.S. Cl.
CPC ............. *F41H 5/0471* (2013.01); *B32B 7/09* (2019.01); *B32B 27/08* (2013.01); *B32B 27/32* (2013.01); *B32B 27/34* (2013.01); *B32B 2571/02* (2013.01)

(58) Field of Classification Search
CPC ......... F41H 1/02; F41H 5/0471; F41H 5/0485
See application file for complete search history.

(56) References Cited

U.S. PATENT DOCUMENTS

| | | | |
|---|---|---|---|
| 5,724,670 A * | 3/1998 | Price ..................... | F41H 5/0485 |
| | | | 2/2.5 |
| 5,943,694 A | 8/1999 | Moureaux et al. | |
| 9,248,893 B2 | 2/2016 | Hellweg et al. | |
| 10,094,640 B2 | 10/2018 | Aquino | |
| 10,750,805 B2 | 8/2020 | Gallagher | |
| 10,782,103 B2 | 9/2020 | Waldrop | |
| 2001/0050492 A1* | 12/2001 | Janevski ................. | B60R 21/12 |
| | | | 2/97 |
| 2011/0185463 A1* | 8/2011 | Weber ....................... | F41H 1/02 |
| | | | 2/2.5 |

(Continued)

FOREIGN PATENT DOCUMENTS

| | | |
|---|---|---|
| CN | 105190222 B | 10/2018 |
| RU | 163979 U1 | 8/2016 |

*Primary Examiner* — J. Woodrow Eldred
(74) *Attorney, Agent, or Firm* — Geoffrey Lottenberg; Berger Singerman LLP

(57) ABSTRACT

A soft body armor arrangement has a plurality of layers of soft ballistic material stacked on one another, each layer comprising a plurality of sub-layers of ballistic material. Each of the layers has a respective seam line attaching two or more respective sections of the layer. The sizes of the section are varied so that the resultant seam lines of adjacent layers are offset and spaced apart from one another, but the overall size and shape of each layer is the same. This avoids stacking and bunching of the seam lines which can cause rigidity and discomfort.

8 Claims, 12 Drawing Sheets

(56) References Cited

U.S. PATENT DOCUMENTS

| | | | |
|---|---|---|---|
| 2012/0160086 A1* | 6/2012 | Carbajal | F41H 5/0485 |
| | | | 89/36.02 |
| 2012/0180176 A1* | 7/2012 | Neal | F41H 1/02 |
| | | | 2/2.5 |
| 2014/0082808 A1* | 3/2014 | Chiou | F41H 5/0471 |
| | | | 2/2.5 |
| 2015/0033429 A1* | 2/2015 | Andrusyszyn | F41H 5/0457 |
| | | | 2/2.5 |

* cited by examiner

STITCHED BODY ARMOR PANELS WITH OFFSET CONSTRUCTION

CROSS REFERENCE TO RELATED APPLICATIONS

This application claims the benefit of U.S. Provisional Application No. 63/345,271 filed on May 24, 2023.

FIELD OF THE INVENTION

The present invention generally relates to a soft body armor arrangement comprising segmented layers of soft body armor held together by seam lines. When brought together to form the soft body armor arrangement, the soft body armor layers' seam lines are positioned in a manner that avoids bunching of the seam lines which can cause rigidity and discomfort.

Figure 1A:
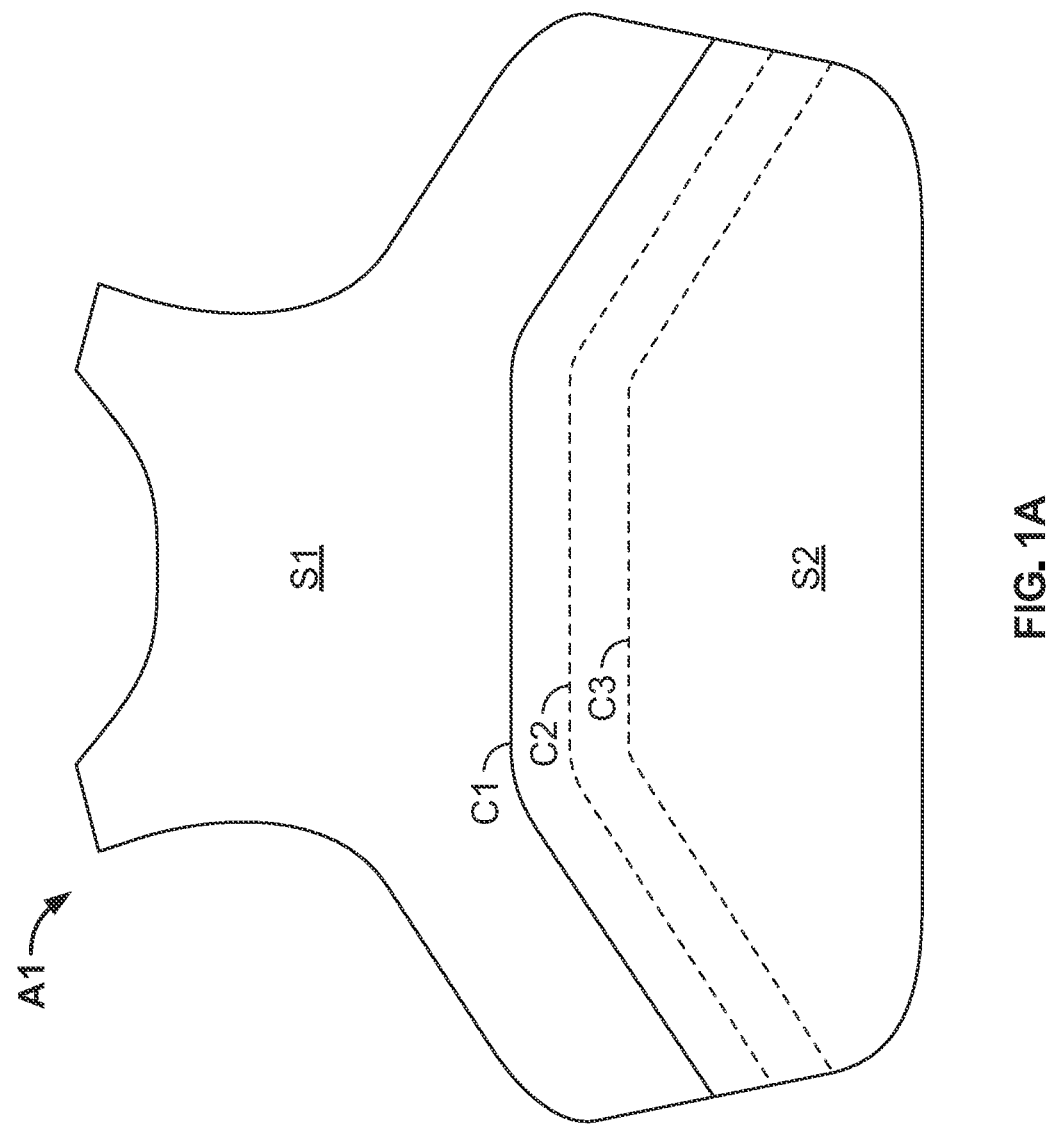
FIG. 1A is a top front view of an embodiment of a soft armor arrangement with offset seam lines extending transversely across the arrangement.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following description, for the purposes of explanation, numerous specific details are set forth in order to provide a thorough understanding of the body armor arrangement of the present invention. It will be apparent, however, to one skilled in the art that the body armor arrangement may be practiced without some of these specific details. Throughout this description, the embodiments and examples shown should be considered as exemplars, rather than as limitations on the body armor arrangement. That is, the following description provides examples, and the accompanying drawings show various examples for the purposes of illustration. However, these examples should not be construed in a limiting sense as they are merely intended to provide examples of the body armor arrangement rather than to provide an exhaustive list of all possible implementations of the body armor arrangement.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Soft body armor, or soft ballistics, refers to a relatively soft and flexible but strong material, such as Kevlar or polyethylene, inserted into or otherwise forming a garment (or portion thereof) worn by a user for protective purposes. Generally, soft armor is distinguished from hard armor, the latter typically presented in the form of thick, rigid plates made of firm, durable materials such as ceramic, ceramic composites, polyethylene, fibers, Kevlar, steel, and the like. Hard armor plates do not readily deform or otherwise conform to the body of the wearer. In many cases, protective garments, such as ballistic vests or armor carriers, utilize a combination of soft and hard armor in order to strike a balance between wearability, comfort, and mobility on the one hand, and maximum ballistic protection on the other hand. It is noted herein that the term ballistic is used for convenience to refer to garments that protect the user against the impacts of ballistic projectiles. However it is appreciated and understood that the soft armor arrangement described herein can be suited for puncture and fragmentation protection, as well as a substitute for ballistic protection.

In traditional soft armor construction, a plurality of layers are stacked on one another, with the number and configuration of layers selected according to the desired ballistic performance of the material. In some embodiments, each of the layers comprises a plurality of sub-layers of ballistic material with again, the number and configuration of sub-layers selected according to the desired ballistic performance of the material. A given layer may comprise a plurality of sections sewn or adhered to one another in order to form a wearable garment. This construction can result in a prominent seam line where the sections of the layer are brought together.

When a plurality of layers are stacked on one another to construct the desired ballistics package, often the seam lines of each layer are stacked on one another, or overlapped in a manner where the seam lines are touching. This creates a firm and often inflexible section of the ballistics package, at the point of contouring, which can result in significant discomfort for the wearer. This is particularly true in the case of soft armor designed for females or where the design otherwise requires more curvature in order to conform to the wearer. Accordingly, the present invention is an alternative construction technique for soft armor which avoids the stacking or aggregating of the seam lines of the layers in order to enhance comfort and mobility.

Figure 1B:
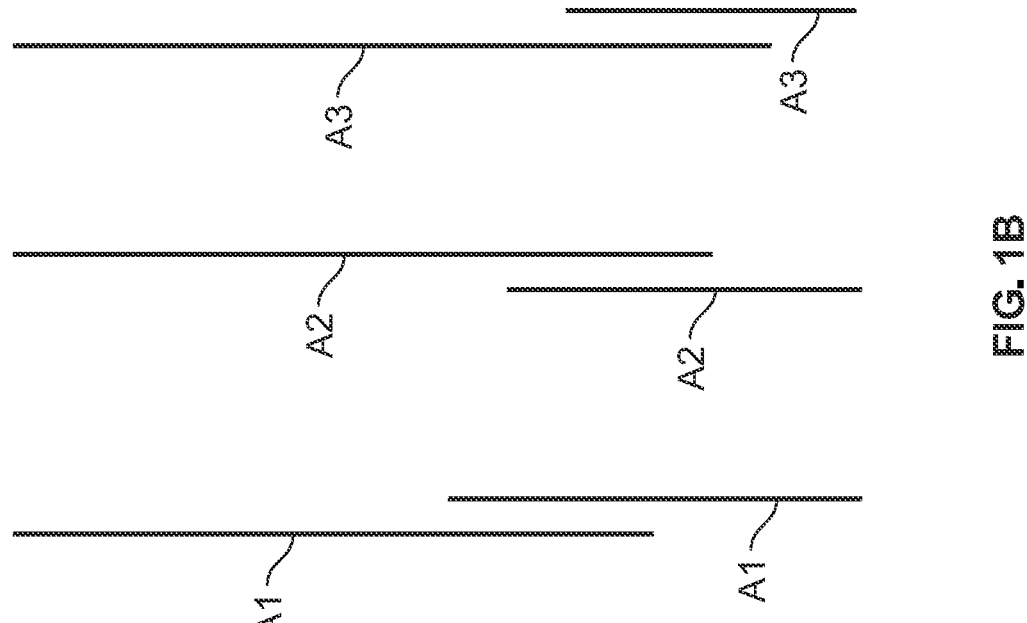
FIG. 1B is a right view of the embodiment of the soft armor arrangement shown in FIG. 1A.
Figure 1C:
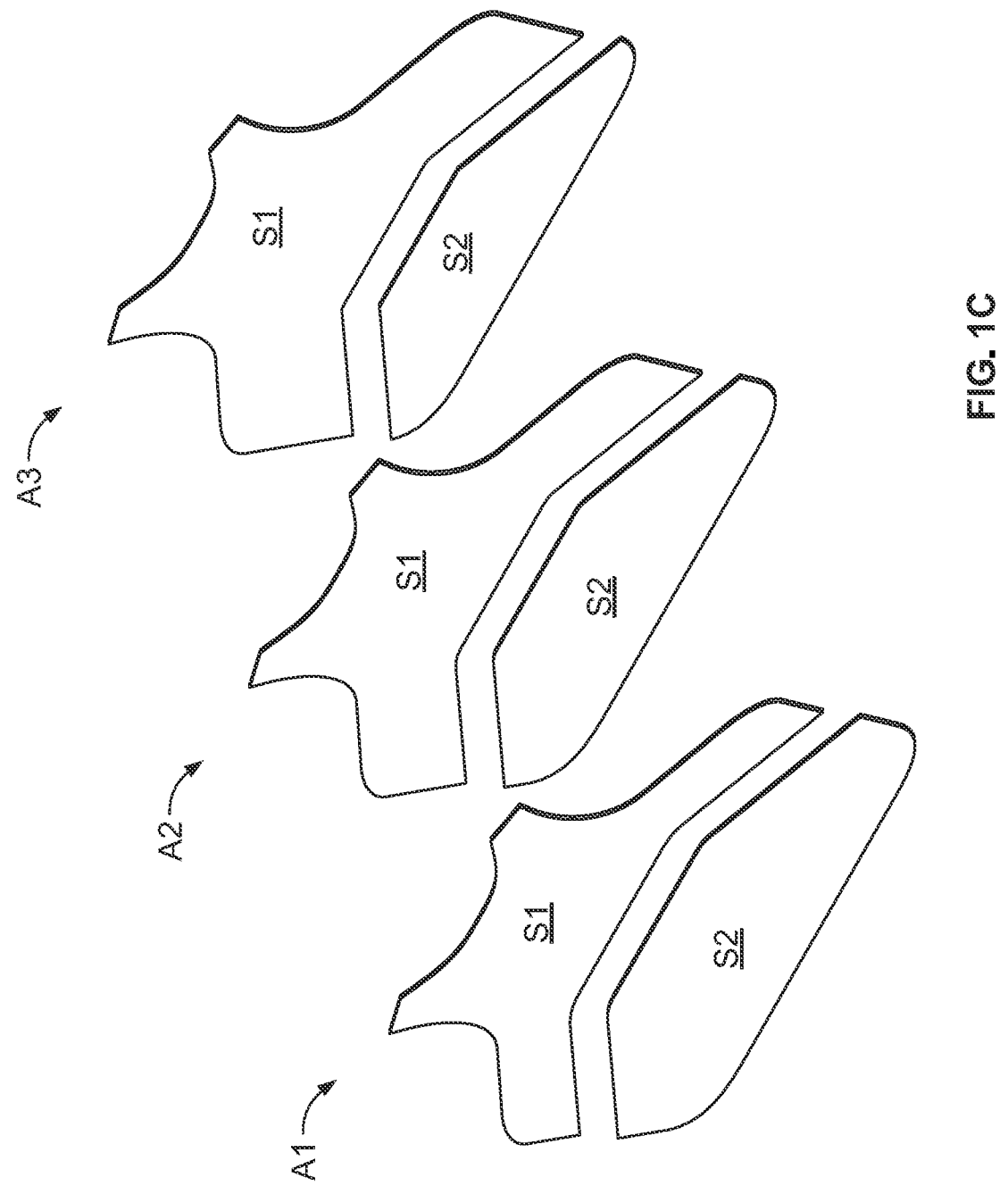
FIG. 1C is a top exploded isometric view of an embodiment of the soft armor arrangement shown in FIG. 1A.

With reference to FIGS. 1A-1C, shown are three layers A1, A2, and A3 of soft armor. Each of the layers A1-A3 includes a respective upper section S1 and a lower section S2. In this case, the layers A1-A3 are shown configured in the shape of a bust portion of a soft armor vest. As shown, the size and shape of each of the respective upper section S1 and lower section S2 of each of the layers A1-A3 is slightly different. For example, the upper section S1 of layer A1 is slightly shorter than that of layer A2 and the upper section S1 of layer A2 is slightly shorter than that of layer A3. Likewise, the lower section S2 of layer A1 is slightly taller than that of layer A2 and the lower section S1 of layer A2 is slightly taller than that of layer A3. However, it is appreciated that each of the layers A1, A2, and A3, when formed in complete, have substantially the same size and shape so as to create an arrangement of cohesive soft armor to form a wearable protective garment (or portion thereof).

In FIGS. 1A-1C, seam line C1 (shown in solid line) is formed where the upper section S1 and lower section S2 of layer A1 meet. In some embodiments, the seam line C1 extends substantially transversely across the arrangement. The seam line C2 of layer A2 and seam line C3 of layer A3 are shown in dotted lines, each also extending substantially transversely across the arrangement. As is apparent from the Figures, because of the different dimensions of the respective sections S1 and S2 of each layer A1, A2, and A3, the respective seam lines C1, C2, and C3 are offset and spaced apart from one another and do not overlap, thereby avoiding the uncomfortable inflexible result if the seams lines were otherwise stacked on and overlapping one another or closely adjacent to one another. This configuration also avoids the need for darts, e.g. folds sewn into the material to facilitate shaping, because the shaping can be comfortably achieved with just the configuration and orientation of the seam lines C1, C2, and C3.

Figure 2A:
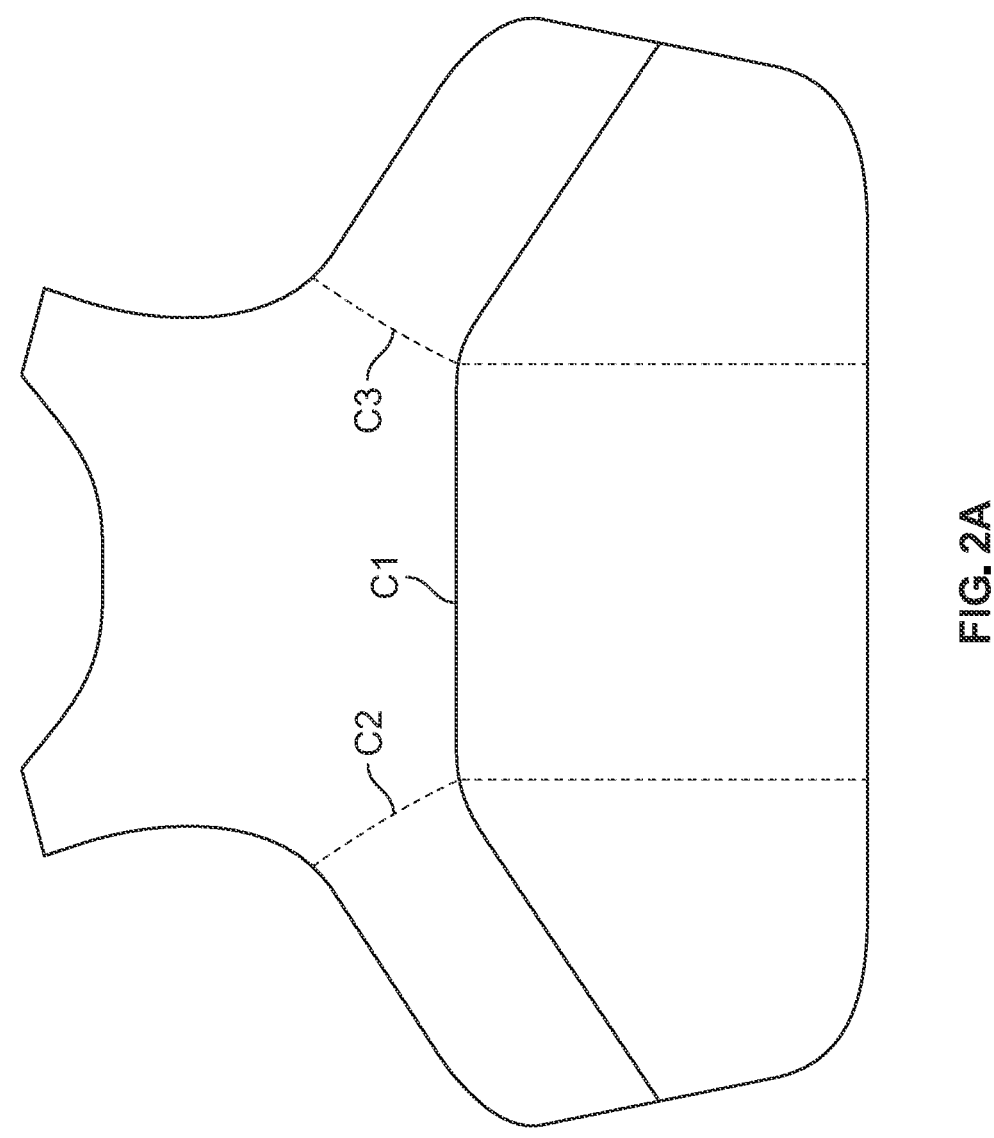
FIG. 2A is a top front view of an embodiment of a soft armor arrangement with two longitudinally extending seam lines and one transversely extending seam line.
Figure 2B:
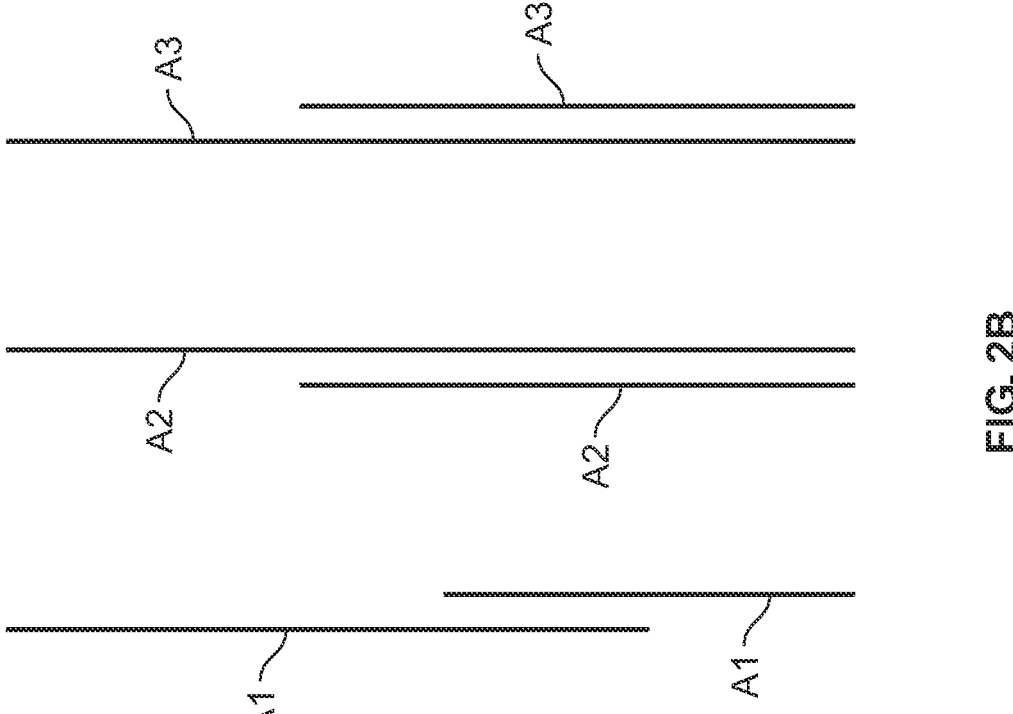
FIG. 2B is a right view of the embodiment of the soft armor arrangement shown in FIG. 2A.
Figure 2C:
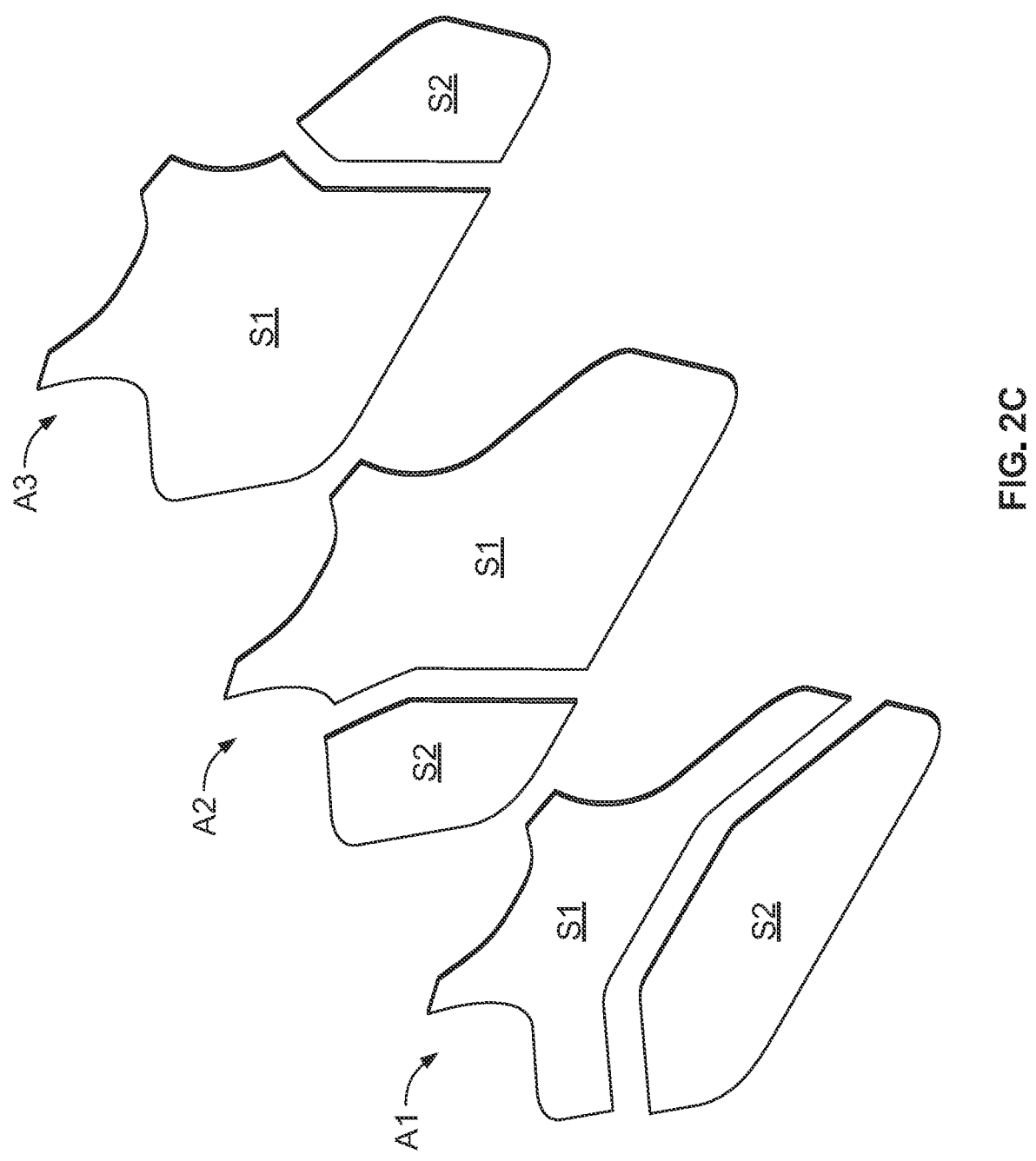
FIG. 2C is an exploded isometric view of the embodiment of the soft armor arrangement shown in FIG. 2A.

With reference to FIGS. 2A-2C, shown is a configuration of the present invention with two substantially longitudinally extending seam lines C2 and C3 and a substantially transversely extending seam line C1 extending across the bust area of the seam lines C2 and C3. As shown in FIG. 2C, this configuration may include three layers A1, A2, and A3 of soft armor, each having two sections S1 and S2. This creates a beveled configuration designed to conform to the contours of the female body. Each layer A1, A2, and A3 includes two sections S1 and S2. Layer Al includes an upper section S1 and a lower section S2. Layer A2 includes a center section S1 and a left section S2. Layer A3 includes a center section S1 and a right section S2. The seam line C1 is formed where the upper section S1 and lower section S2 of layer Al meet. The seam line C2 is formed where the center section S1 and the left section S2 of layer A2 meet. The seam line C3 is formed where the center section S1 and right section S2 of layer A3 meet. Again, the need for darts is avoided and, in this case, the respective longitudinally extending seam lines C2 and C3 overlap the transversely extending seam line C1 at only one point each.

Figure 3A:
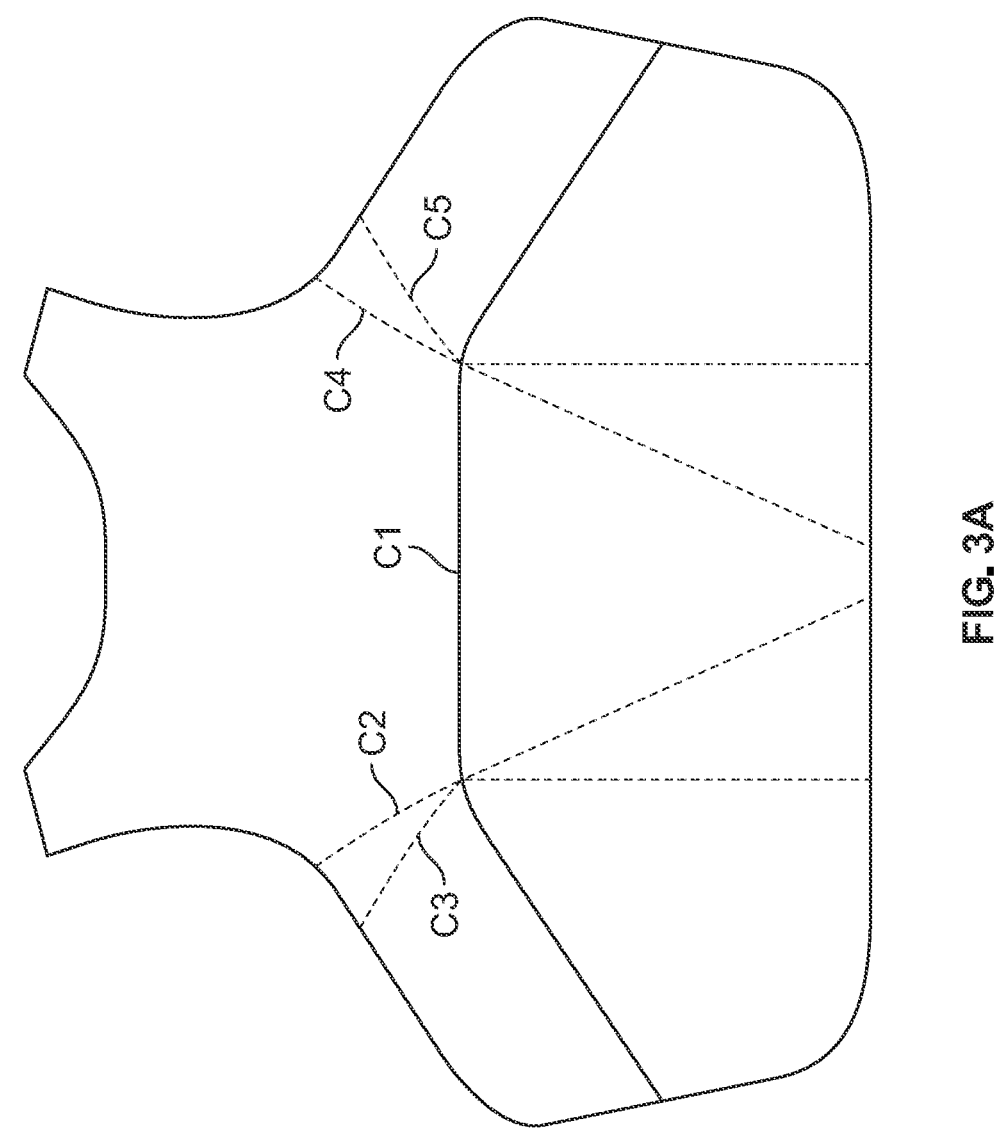
FIG. 3A is a top front view of an embodiment of a soft armor arrangement with multiple seam lines traversing one another.
Figure 3B:
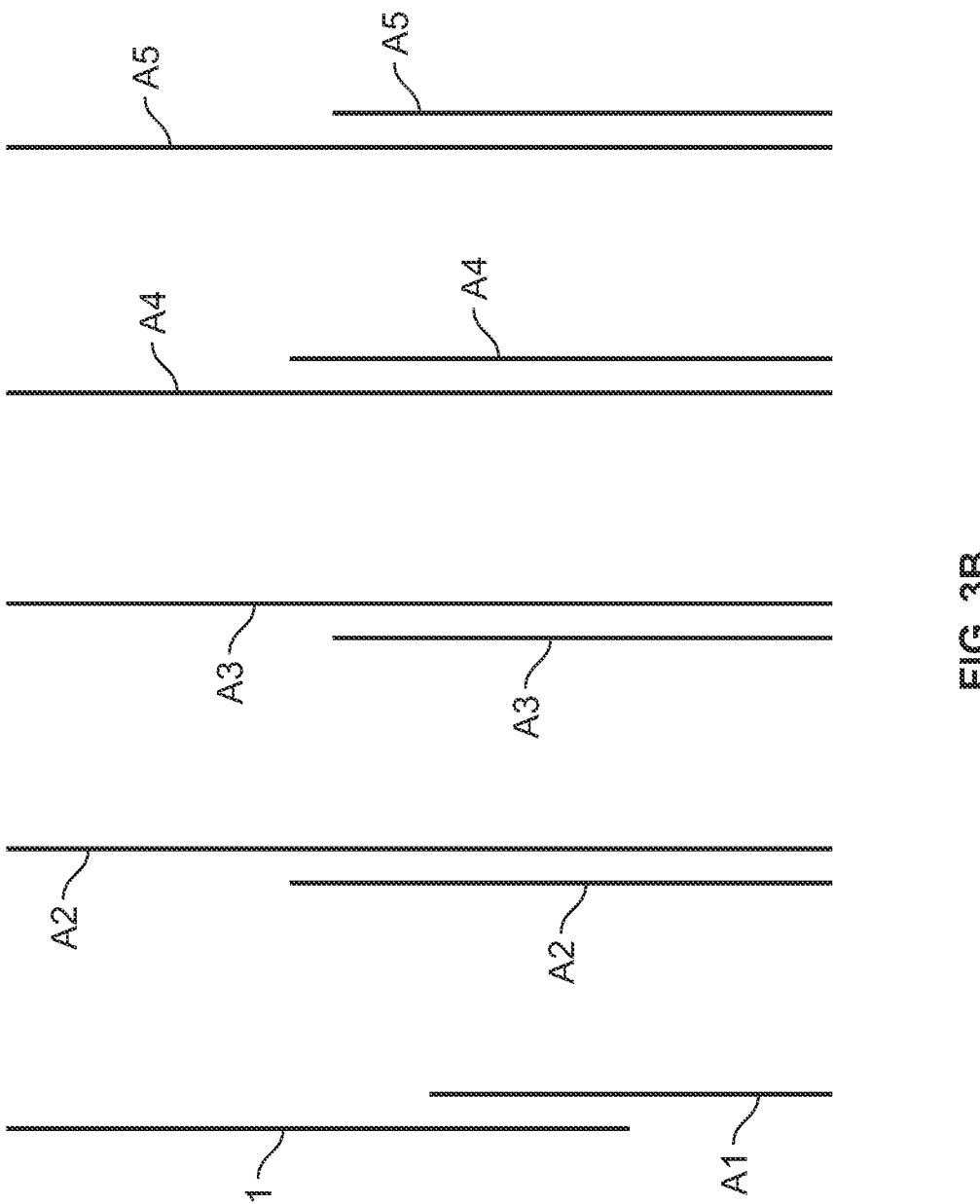
FIG. 3B is a right view of the embodiment of the soft armor arrangement shown in FIG. 3A.
Figure 3C:
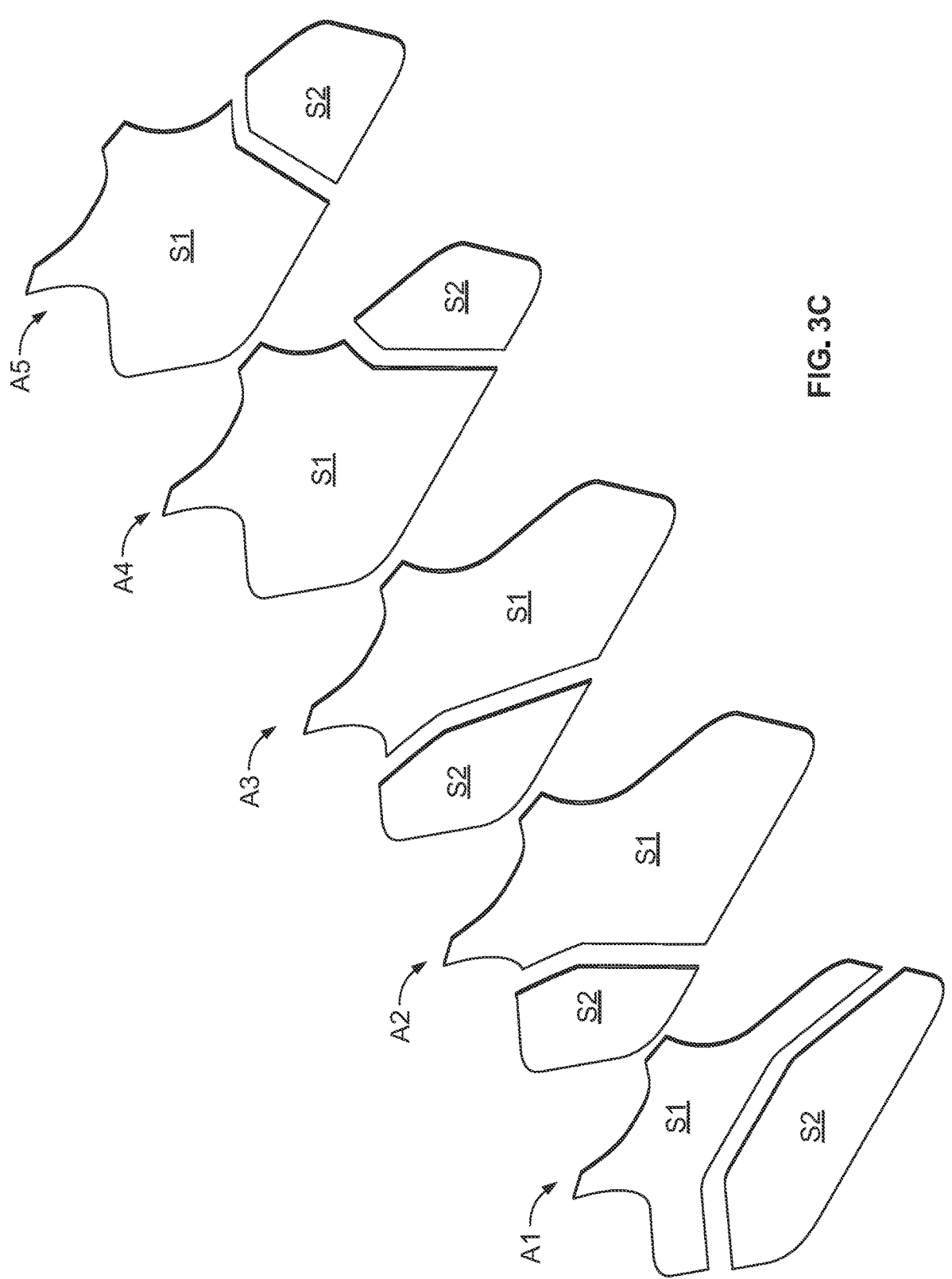
FIG. 3C is exploded isometric view of an embodiment of the soft armor arrangement shown in FIG. 3A.

With reference to FIGS. 3A-3C, shown is another embodiment of a beveled configuration, with multiple seam lines C1, C2, C3, C4, and C5, with C5 transverse and across the other seam lines at a single point. The embodiment shown in 3C includes five layers A1, A2, A3, A4, and A5, each having two sections S1 and S2. Layer Al includes an upper section S1 and a lower section S2. Layer A2 includes a center section S1 and a left section S2. Layer A3 includes a center section S1 and a left section S2. Layer A4 is a mirrored layer A2 and layer A5 is a mirrored layer A3. FIG. 3C shows that because of the different dimensions of the respective sections S1 and S2 of each layer A1, A2, A3, A4, and A5 the respective seam lines C1, C2, C3, C4, and C5 are offset and spaced apart from one another such that seam lines C2 and C3 together overlap the transversely extending seam line C1 at only one point and seam lines C4 and C5 together overlap the transversely extending seam line C1 at only one point.

Figure 4A:
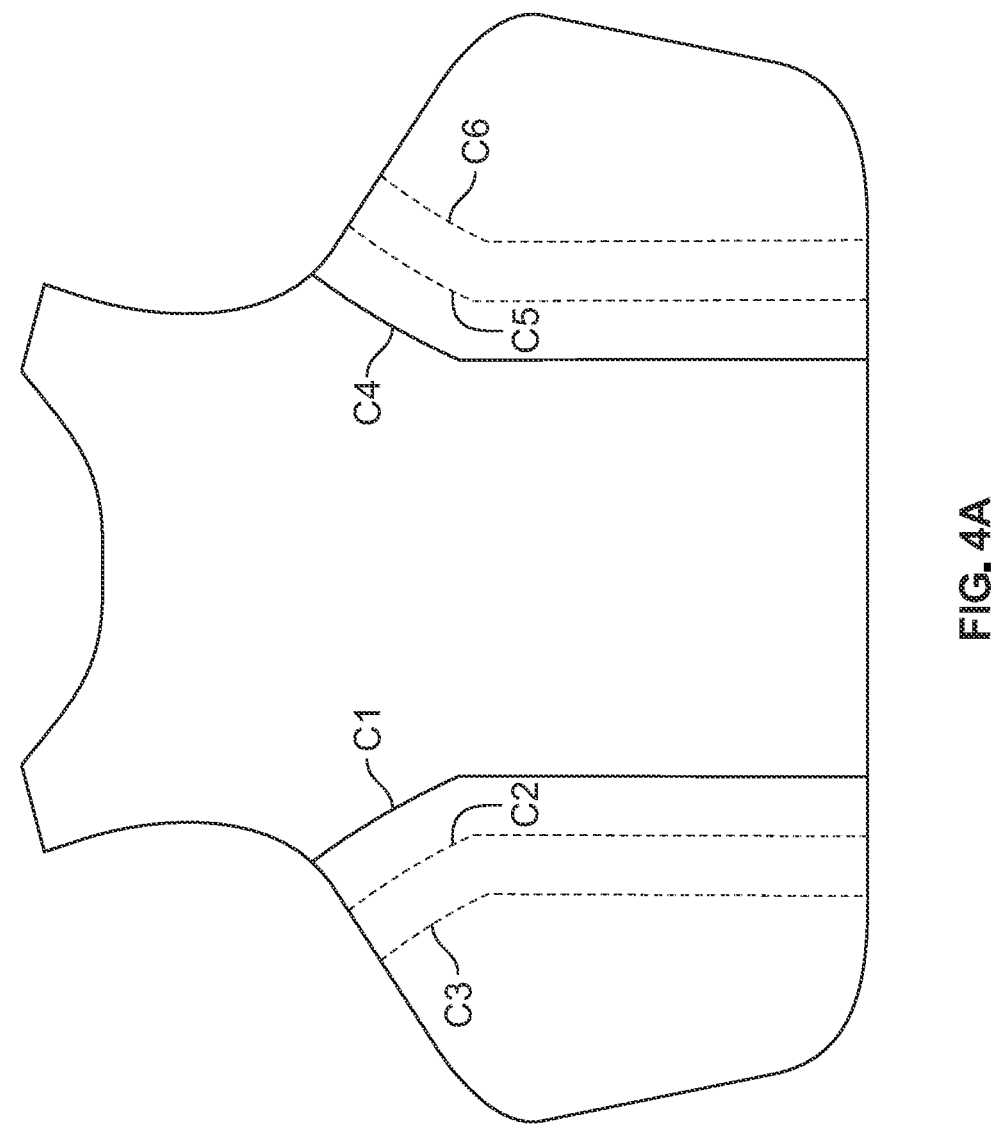
FIG. 4A is a top front view of an embodiment of a soft armor arrangement in a bi-level configuration.
Figure 4B:
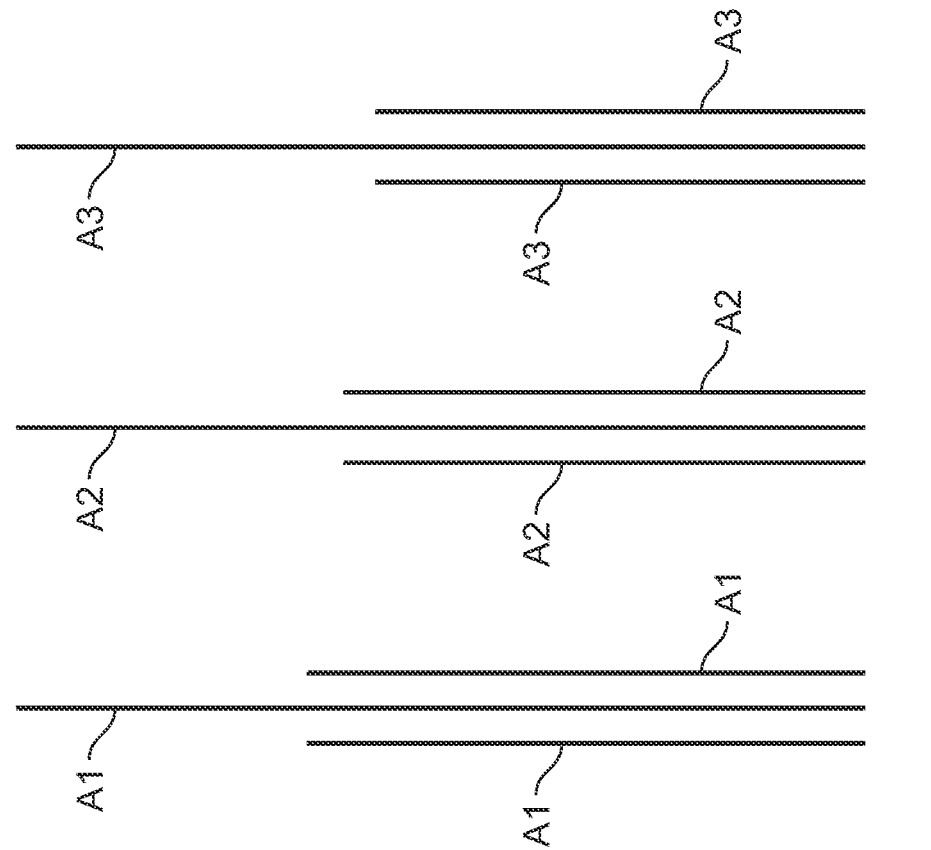
FIG. 4B is a right view of the embodiment of the soft armor arrangement shown in FIG. 4A.
Figure 4C:
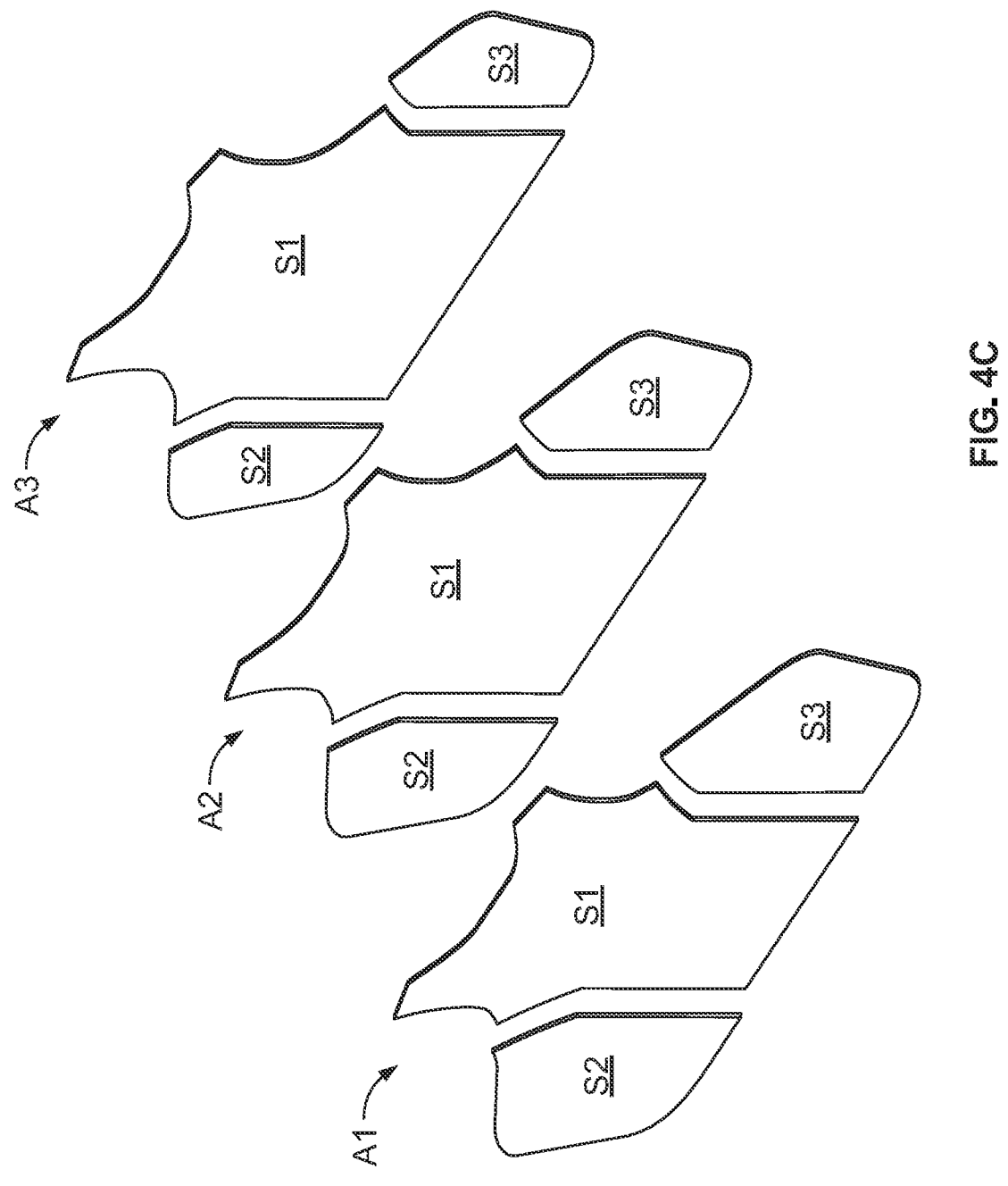
FIG. 4C is an exploded isometric view of the embodiment of the soft armor arrangement shown in FIG. 4A.

With reference to FIGS. 4A-4C, shown is an embodiment of the invention in a bi-level configuration, with each layer A1, A2, and A3 of soft armor having three sections S1, S2, and S3 and thus two sets of three spaced apart, offset, non-overlapping substantially longitudinally extending seam lines C1, C2, C3, C4, C5, and C6 about the gusset area of the garment portion.

Here, each layer A1, A2, and A3 may include a center section S1, a left section S2, and a right section S3, wherein the left and right sections S2 and S3 of the first layer are smaller than the respective left and right sections S2 and S3 of the adjacent layers and the center section S1 of the first layer is larger than the respective center sections S1 of the adjacent layers so that the seam lines C1, C2, C3, C4, C5, and C6 attaching the respective center-left-right sections S1, S2, and S3 are spaced apart and offset and do not overlap.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:
1. A soft armor arrangement, comprising:
a plurality of layers arranged to form a soft armor arrangement, each layer of the plurality of layers comprising at least two sections joined at a seam line,
wherein each respective seam line of each layer is spaced apart and offset from one another such that the respective seam lines do not overlap; and
wherein every section of the assembly is of a different size.

2. The soft armor arrangement of claim 1, wherein each of the layers comprises soft ballistic material.

3. The soft armor arrangement of claim 1, wherein the soft armor arrangement has no darts.

4. The soft armor arrangement of claim 1, wherein the respective seam lines extend transversely across the arrangement.

5. The soft armor arrangement of claim 1, wherein each layer includes one or more sublayers.

6. A soft armor arrangement, comprising:

at least two layers of soft ballistic material stacked on one another to form a soft armor arrangement, a first layer of the at least two layers comprising at least one upper section and at least one lower section joined at a seam line, and a second layer of the at least two layers includes at least one upper section and at least one lower section joined at a seam line, wherein the at least one upper section of the first layer is of a different size than the at least one upper section of the second layer, and the at least one lower section of the first layer is of a different size than the at least one lower section of the second layer, and wherein the seam line of the first layer and the seam line of the second layer are spaced apart and offset such that the seam lines do not overlap.

7. The soft armor arrangement of claim 6, wherein the soft armor arrangement has no darts.

8. The soft armor arrangement of claim 6, wherein each layer includes one or more sublayers.

\* \* \* \* \*